(12) United States Patent
Mori

(10) Patent No.: US 6,796,177 B2
(45) Date of Patent: Sep. 28, 2004

(54) GYROSCOPIC APPARATUS AND ELECTRONIC APPARATUS INCLUDING SAME

(75) Inventor: Akira Mori, Nagaokakyo (JP)

(73) Assignee: Murata Manufacturing Co., Ltd., Kyoto (JP)

(*) Notice: Subject to any disclaimer, the term of this patent is extended or adjusted under 35 U.S.C. 154(b) by 107 days.

(21) Appl. No.: 10/097,982

(22) Filed: Mar. 15, 2002

(65) Prior Publication Data

US 2002/0139186 A1 Oct. 3, 2002

(30) Foreign Application Priority Data

Mar. 30, 2001 (JP) ........................... 2001-100180

(51) Int. Cl.[7] .............................................. G01P 9/00
(52) U.S. Cl. ................................. 73/504.02; 73/504.16
(58) Field of Search ........................ 73/504.02, 504.12, 73/504.03, 504.04, 504.16; 310/352

(56) References Cited

U.S. PATENT DOCUMENTS

| | | | | |
|---|---|---|---|---|
| 4,791,815 A | * | 12/1988 | Yamaguchi et al. | ...... 73/504.16 |
| 5,703,293 A | | 12/1997 | Zabler et al. | ............. 73/504.02 |
| 5,889,208 A | * | 3/1999 | Nose | ........................ 73/504.16 |
| 5,895,850 A | | 4/1999 | Buestgens | ................ 73/504.12 |
| 5,962,786 A | | 10/1999 | Le Traon et al. | ........ 73/514.29 |
| 6,658,937 B2 | * | 12/2003 | Ao et al. | .................. 73/504.14 |

FOREIGN PATENT DOCUMENTS

| | | |
|---|---|---|
| EP | 0 664 438 | 1/1994 |
| EP | 0 971 208 | 1/2000 |
| JP | 7-332988 | 12/1995 |
| WO | WO 95/34798 | 12/1995 |

* cited by examiner

Primary Examiner—Hezron Williams
Assistant Examiner—Jacques Saint-Surin
(74) Attorney, Agent, or Firm—Keating & Bennett, LLP

(57) ABSTRACT

A gyroscopic apparatus includes two gyro sensors having substantially the same structure. The two gyro sensors are arranged on first and second major surfaces, respectively, of a mounting base so that the gyro sensors have an approximately 180-degree rotation symmetry about a virtual rotation axis penetrating the mounting base substantially parallel thereto in the same direction as rotation detecting axes. The outputs of the two gyro sensors are added, and the sum is output. Thus, the output of the gyroscopic apparatus is much less susceptible to impact from a specific direction, and a high detection accuracy can be maintained.

20 Claims, 9 Drawing Sheets

GYROSCOPIC APPARATUS AND ELECTRONIC APPARATUS INCLUDING SAME

BACKGROUND OF THE INVENTION

1. Field of the Invention

The present invention relates to a gyroscopic apparatus and an electronic apparatus including the same, such as a gyroscopic apparatus used for detecting a vehicle rollover, vehicle attitude, and camera movement caused by shaking, vibration or an unsteady hand and to an electronic apparatus including such a gyroscopic apparatus.

2. Description of the Related Art

Various types of gyroscopic apparatuses used for detecting a vehicle rollover, vehicle attitude, and camera movement or vibration have been proposed. For example, Japanese Unexamined Patent Application Publication No. 7-332988 discloses a gyroscopic apparatus including a gyro sensor which uses a vibrator that is constructed by attaching two piezoelectric substrates which are polarized in opposite directions.

In this gyro sensor, the vibrator which is held in the air by a supporting member is caused to bend and vibrate in the thickness direction (the same as the thickness direction of the piezoelectric substrates) while both ends thereof are free. When an angular velocity is applied to the gyro sensor in the longitudinal direction (the same as the longitudinal direction of the piezoelectric substrates) as a rotation axis, bending vibrations in the vibrator width direction are generated by a Coriolis force. From the bending vibrations, the direction and magnitude of the angular velocity are detected.

FIG. 16A is a perspective view of a known gyroscopic apparatus, and FIG. 16B is an elevation view of the known gyroscopic apparatus. Referring to FIGS. 16A and 16B, a gyroscopic apparatus 1 includes a gyro sensor 2. The gyro sensor 2 includes a stem 3 which has pin terminals 3a, a cover 4 mounted on the stem 3, and a vibrator 5 which is a vibrating mass arranged in the interior of a casing sealed by the stem 3 and the cover 4. The vibrator 5 is located at a position that is offset from the stem 3 in the casing. Descriptions of a supporting member for supporting the vibrator 5 in the air and a circuit portion for causing the vibrator 5 to vibrate and for processing a signal output from the vibrator 5 are omitted.

FIG. 17 shows the structure of the vibrator 5. The vibrator 5 is formed by attaching, with an intermediate electrode 5F therebetween, a piezoelectric substrate 5U which is polarized in the thickness direction and which contains detecting electrodes 5L and 5R on a first major surface thereof and a piezoelectric substrate 5D which is polarized in the thickness direction and which contains a common electrode 5C on a first major surface thereof, thus bonding second major surfaces of the piezoelectric substrates 5U and 5D.

By applying a drive signal to the common electrode 5C, the vibrator 5 generates both-end-free bending vibrations in the thickness direction (the same as the thickness direction of the piezoelectric substrates 5U and 5D). By applying an angular velocity to the vibrator 5 in the longitudinal direction (the same as the longitudinal direction of the piezoelectric substrates 5U and 5D) as a rotation axis (rotation detecting axis), the Coriolis force generates both-end-free bending vibrations in the width direction (the same as the width direction of the piezoelectric substrates 5U and 5D). Due to the bending vibrations in the width direction, signals in opposite directions are generated at the detecting electrodes 5L and 5R. From these signals, the magnitude and the direction of the angular velocity can be detected.

Referring again to FIG. 16B, when an impact is applied to the gyroscopic apparatus 1 constructed as described above in the direction indicated by the outline arrow, since the vibrator 5 is arranged at an offset position, the vibrator 5 is temporarily displaced to a vibrator 5' of FIG. 16B due to an elastic deformation of the supporting member and deformation of a cushion. For example, when the gyroscopic apparatus 1 is installed in a vehicle, such an impact is generated in the vertical direction of the vehicle caused by unevenness of a road surface. Although not shown, when the direction of the impact is reversed, the displacement of the vibrator 5 is also reversed. Since the displacement includes a rotational component indicated by the arrow in FIG. 16B, the output of the gyro sensor fluctuates. The larger the offset (positional offset) of the vibrator 5 in the casing defined by the stem 3 and the cover 4, the more noticeable the fluctuation becomes.

FIG. 18 shows the relationship between the acceleration of impact applied randomly to the gyroscopic apparatus 1 arranged as described above in the direction indicated by the outline arrow of FIG. 16B and the output of the gyroscopic apparatus 1. An angular velocity applied to the gyroscopic apparatus 1 is constant. As is clear from FIG. 18, the output of the gyroscopic apparatus 1 fluctuates greatly in accordance with the impact, and the output includes an error signal. It is understood that the output of the gyroscopic apparatus 1 is susceptible to the impact.

When the output of the gyroscopic apparatus 1 includes an error signal, an accurate angular velocity cannot be detected.

SUMMARY OF THE INVENTION

In order to solve the foregoing problems, preferred embodiments of the present invention provide a gyroscopic apparatus that is capable of detecting an accurate angular velocity even when an external impact is applied thereto and an electronic apparatus including such a novel gyroscopic apparatus.

According to one preferred embodiment of the present invention, a gyroscopic apparatus includes first and second gyro sensors having substantially the same structure, and an adder for adding the outputs of the first and second gyro sensors. The first and second gyro sensors are arranged so that signals output in response to an angular velocity applied thereto have the same sign and that signals output in response to an impact applied thereto have the opposite signs.

The first and second gyro sensors may be arranged to have an approximately 180-degree rotation symmetry about a virtual rotation axis which is arranged in the direction of rotation detecting axes.

The second gyro sensor may be arranged at a position defined by parallel translating the first gyro sensor which is rotated by approximately 180 degrees about a virtual rotation axis which is in the direction of rotation detecting axes.

A gyroscopic apparatus according to another preferred embodiment of the present invention includes first and second gyro sensors having substantially the same structure, and a subtracter for obtaining the difference between the outputs of the first and second gyro sensors. The first and second gyro sensors are arranged so that signals output in response to an angular velocity applied thereto have the opposite signs and that signals output in response to an impact applied thereto have the same sign.

The first and second gyro sensors may be arranged to have an approximately 180-degree rotation symmetry about a virtual rotation axis that is substantially perpendicular to the rotation detecting axes.

The second gyro sensor may be arranged at a position defined by parallel translating the first gyro sensor which is rotated by approximately 180 degrees about a virtual rotation axis that is substantially perpendicular to the rotation detecting axes.

The gyroscopic apparatus may further include a mounting base, wherein the first gyro sensor may be disposed on a first major surface of the mounting base and the second gyro sensor may be disposed on a second major surface of the mounting base.

The gyroscopic apparatus may further include a mounting base, wherein the first and second gyro sensors may be disposed on one of the surfaces of the mounting base.

The first and second gyro sensors may include vibrating gyroscopes having vibrating masses.

An electronic apparatus according to another preferred embodiment of the present invention preferably includes a gyroscopic apparatus according to the preferred embodiments described above.

With a gyroscopic apparatus constructed according to various preferred embodiments of the present invention, a highly accurate output can be obtained in response to an impact from a specific direction. Also, the performance of an electronic apparatus includes such a novel gyroscopic apparatus is greatly improved.

Other features, elements, characteristics and advantages of the present invention will be described with respect to preferred embodiments thereof with reference to the attached drawings.

DETAILED DESCRIPTION OF PREFERRED EMBODIMENTS

Figure 1:
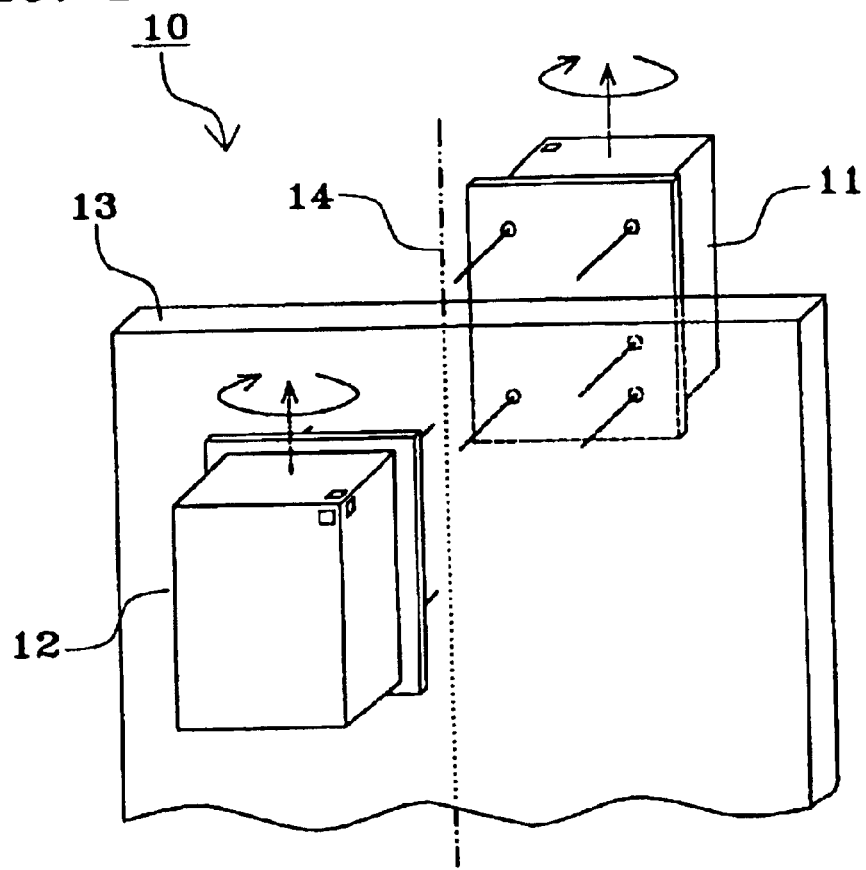
FIG. 1 is a perspective view of a gyroscopic apparatus according to a first preferred embodiment of the present invention.
Figure 16A:
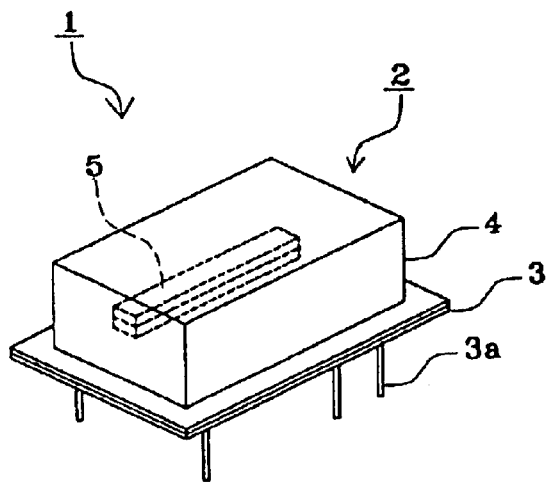
FIG. 16A is a perspective view and FIG. 16B is an elevation view of a known gyroscopic apparatus.
Figure 16B:
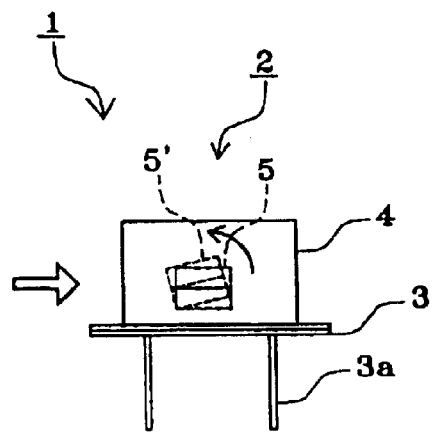
Figure 17:
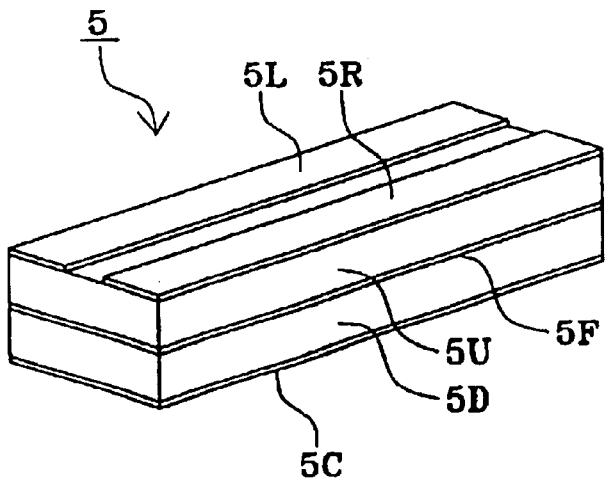
FIG. 17 is a perspective view of a vibrator used in the gyroscopic apparatus shown in FIG. 16.
Figure 18:
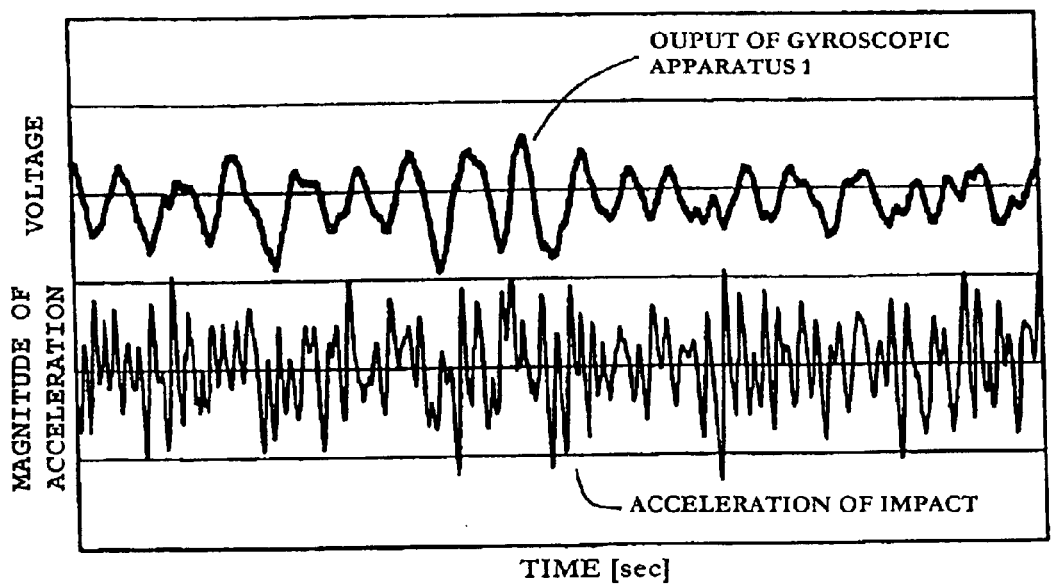
FIG. 18 is a characteristic diagram showing the relationship between the acceleration of impact applied to the gyroscopic apparatus shown in FIG. 16 and the output thereof.

FIG. 1 is a perspective view of a gyroscopic apparatus according to a first preferred embodiment of the present invention. Referring to FIG. 1, a gyroscopic apparatus 10 preferably includes two gyro sensors 11 and 12 having substantially the same structure and a mounting base 13 on which the gyro sensors 11 and 12 are mounted. The structure of the gyro sensors 11 and 12 is preferably substantially the same as that of the gyro sensor 2 of the known gyroscopic apparatus 1 shown in FIGS. 16A and 16B. Each the gyro sensors 11 and 12 respectively includes vibrators 11a and 12a (not shown). As is described below, an adder is provided on the mounting base 13. The adder is connected to the two gyro sensors 11 and 12 and adds signals output from the two gyro sensors 11 and 12. Here, a description of the adder is omitted as the features of an adder are known.

The gyro sensor 11 and the gyro sensor 12 are arranged on a first major surface and a second major surface, respectively, of the mounting base 13 so that rotation detecting axes are in the same direction (upward in FIG. 1) and that the gyro sensors 11 and 12 are opposed to each other. The positional relationship of the gyro sensor 12 with the gyro sensor 11 is such that the gyro sensors 11 and 12 have an approximately 180-degree rotation symmetry about a virtual rotation axis 14 penetrating the mounting base 13 that is substantially parallel thereto in the same direction as the rotation detecting axes. In FIG. 1, preferably quadrangular marks are placed on three surfaces near a specific corner of each casing of the gyro sensors 11 and 12 in order that the positional relationship between the two gyro sensors 11 and 12 can be easily recognized. Hereinafter, similar marks are placed in the drawings for the same purpose, although descriptions thereof are omitted.

Figure 2:
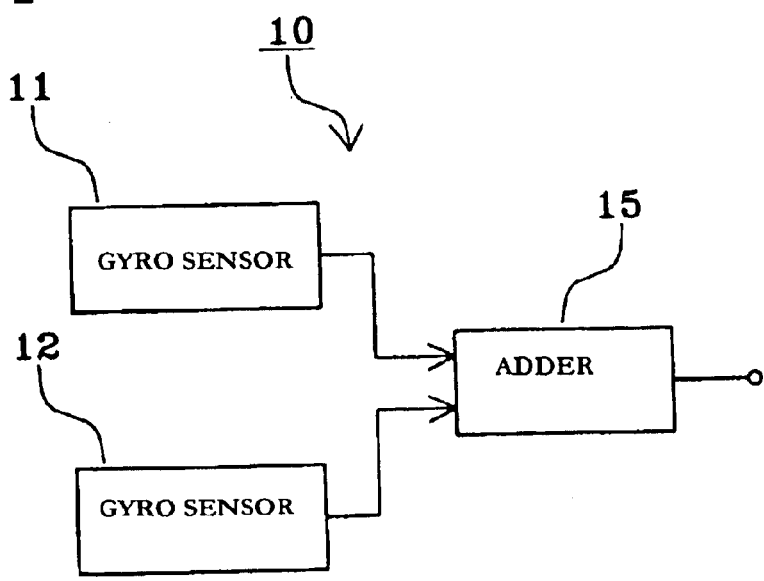
FIG. 2 is a block diagram of the gyroscopic apparatus shown in FIG. 1.

FIG. 2 is a block diagram of the gyro sensor 10 shown in FIG. 1. As shown in FIG. 2, the gyro sensor 10 preferably includes the two gyro sensors 11 and 12 and an adder 15 for adding the outputs of the two gyro sensors 11 and 12.

In the gyro sensor 10 shown in FIGS. 1 and 2, when an angular velocity is applied in the direction of the rotation detecting axes, the gyro sensor 11 outputs a DC voltage signal having a sign that varies in accordance with the direction of the angular velocity and having a voltage that varies in accordance with the magnitude of the angular velocity. Since the direction of the rotation detecting axis of the gyro sensor 12 is the same as that of the gyro sensor 11, the gyro sensor 12 outputs a signal of the same magnitude, with the same sign as that of the gyro sensor 11. The adder 15 adds the signals and outputs the sum, i.e., a double value.

Figure 3:
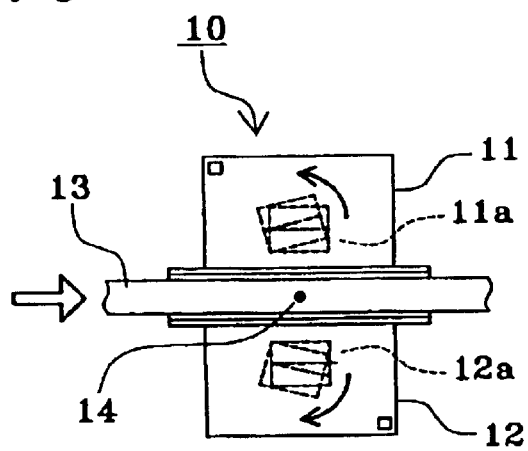
FIG. 3 is an elevation view of the gyroscopic apparatus shown in FIG. 1.

FIG. 3 is an elevation view of the gyroscopic apparatus 10 (viewed from the direction of the rotation detecting axes). Using FIG. 3, the operation of the gyroscopic apparatus 10 to which an impact is applied will be considered. FIG. 3 shows the vibrators 11a and 12a, which are not shown in FIG. 1.

When an impact is applied to the gyroscopic apparatus 10 from the left, that is, in the direction indicated by the outline arrow of FIG. 3, in the gyro sensor 11, the vibrator 11a is displaced in the counter clockwise direction since the vibrator 11a is arranged at a position that is offset to the stem in the casing. A rotational component included in the displacement is added to the original output obtained by the angular velocity and is output. In contrast, in the gyro sensor 12, the vibrator 12a is displaced in the clockwise direction. A rotational component included in the displacement is added to the original output obtained by the angular velocity and is output. In the gyro sensors 11 and 12, the absolute values of the added signal components due to the same impact are substantially equal. On the other hand, in the gyro sensors 11 and 12, the rotational components due to the impact applied to the vibrators 11a and 12a are in the opposite directions. As a result, the signal components generated due to the impact have opposite signs. When the signal components are added by the adder 15, the signal components are canceled out. Thus, the output of the gyroscopic apparatus 10 is not influenced by the impact.

Figure 4:
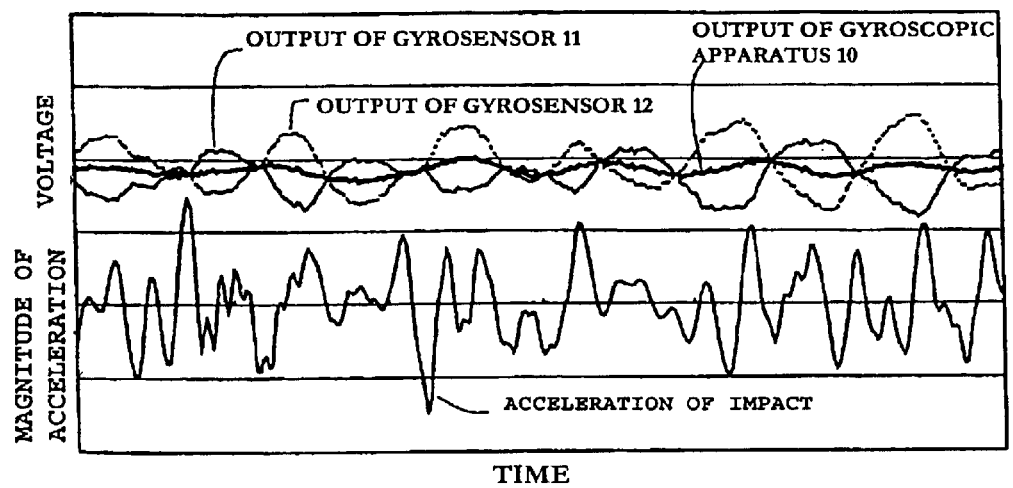
FIG. 4 is a characteristic diagram showing the relationship between the acceleration of impact applied to the gyroscopic apparatus shown in FIG. 1 and the output thereof.

FIG. 4 shows the relationship of the acceleration of the impact applied randomly to the gyroscopic apparatus 10 arranged as described above in the direction indicated by the outline arrow of FIG. 3 with the outputs of the gyroscopic apparatus 10 and the gyro sensors 11 and 12. For the purpose of comparison, the output of the gyroscopic apparatus 10 is reduced to half. An angular velocity applied to the gyroscopic apparatus 19 is constant. As is clear from FIG. 4, the outputs of the gyro sensors 11 and 12 fluctuate greatly due to the impact. Since the fluctuations are in the opposite directions, the output of the gyroscopic apparatus 10, namely, the sum of the two outputs, fluctuates little. Thus, the output of the gyroscopic apparatus 10 is not susceptible to the impact.

According to the gyroscopic apparatus 10, by arranging the two gyro sensors 11 and 12 to have an approximately 180-degree rotation symmetry about the virtual rotation axis in the direction of the rotation detecting axes, the output of the gyroscopic apparatus 10 becomes less susceptible to impact from a specific direction.

According to the gyroscopic apparatus 10, the two gyro sensors 11 and 12 are arranged to have a 180-degree rotation symmetry about the virtual rotation axis which is in the direction of the rotation detecting axes. Alternatively, the gyro sensor 12 can be arranged at a position defined by parallel translating the gyro sensor 11 which is rotated by approximately 180 degrees about the virtual rotation axis, which is in the direction of the rotation detecting axes, that is, by parallel translating the gyro sensor 11 having the precise symmetry along a mounting surface of the mounting base 13. With this arrangement, the operation that is equivalent to that in a case where two gyro sensors have precise symmetry, as in the gyroscopic apparatus 1, can be achieved.

Figure 5:
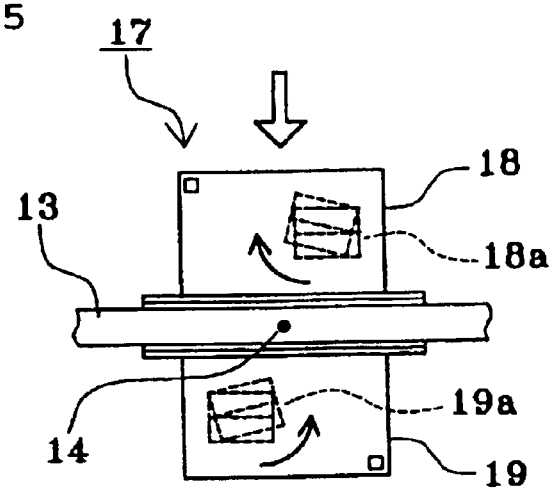
FIG. 5 is an elevation view of a gyroscopic apparatus according to a second preferred embodiment of the present invention.

FIG. 5 is an elevation view of a gyroscopic apparatus according to a second preferred embodiment of the present invention. In FIG. 5, the same reference numerals are given to the same elements or to elements corresponding to those in FIG. 3, and descriptions of the common portions are omitted.

Referring to FIG. 5, a gyroscopic apparatus 17 preferably includes gyro sensors 18 and 19, instead of the gyro sensors 11 and 12 in the gyroscopic apparatus 10. The gyro sensors 17 and 18 include vibrators 18a and 19a, respectively. Basically, the structure of the gyro sensors 18 and 19 is substantially the same as that of the gyro sensor 11 and 12. The gyro sensors 18 and 19 only differ from the gyro sensors 11 and 12 in that the vibrators 18a and 19a are located at positions that are offset in the width direction in the casings. The positional relationship of the gyro sensor 19 with the gyro sensor 18 is such that the gyro sensors 18 and 19 have an approximately 180-degree rotation symmetry about the virtual rotation axis 14 penetrating the mounting base 13 substantially parallel thereto in the same direction as the rotation detecting axes.

In the gyroscopic apparatus 17 shown in FIG. 5, when an angular velocity in the direction of the rotation detecting axis is applied, the gyro sensors 18 and 19 output signals of substantially equal magnitude with the same sign. An adder (not shown) adds the signals and outputs the sum, specifically, a double value.

When an impact is applied to the gyroscopic apparatus 17 arranged as described above and as viewed from the top, that is, in the direction indicated by the outline arrow of FIG. 5, in the gyro sensor 18, the vibrator 18a is displaced in the clockwise direction since the vibrator 18a is arranged at a position offset in the width direction in the casing. A rotational component included in the displacement is added to the original output obtained by the angular velocity and is output. In contrast, in the gyro sensor 19, the vibrator 19a is displaced in the counter clockwise direction. A rotational component included in the displacement is added to the original output obtained by the angular velocity and is output. In the gyro sensors 18 and 19, the absolute values of the added signal components generated due to the same impact are substantially equal. On the other hand, in the gyro sensors 18 and 19, the rotational components generated due to the impact applied to the vibrators 18a and 19a are in the opposite directions. Thus, the signal components generated due to the impact have the opposite sings. When the signal components are added by the adder (not shown), the signal components are canceled out. The output of the gyroscopic apparatus 17 is not influenced by the impact.

According to the gyroscopic apparatus 17, by arranging the two gyro sensors 18 and 19 to have an approximately 180-degree rotation symmetry about the virtual rotation axis in the direction of the rotation detecting axes, the output of the gyroscopic apparatus 17 becomes less susceptible to impact from a specific direction.

Figure 6:
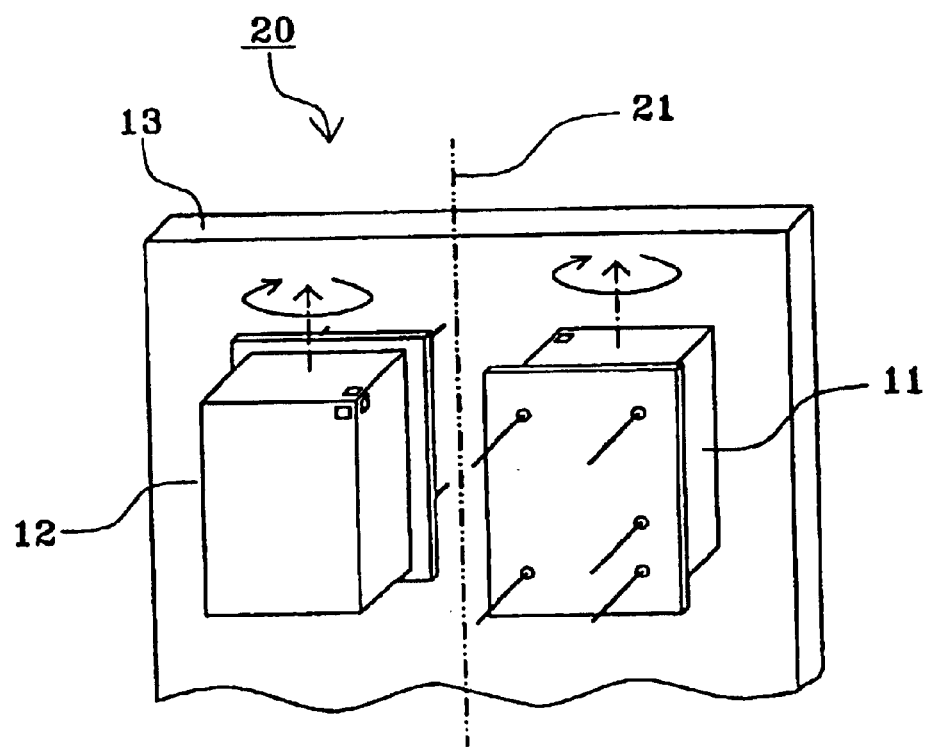
FIG. 6 is a perspective view of a gyroscopic apparatus according to a third preferred embodiment of the present invention.

FIG. 6 is a perspective view of a gyroscopic apparatus according to a third preferred embodiment of the present invention. In FIG. 6, the same reference numerals are given to the same elements or to elements corresponding to those in FIG. 1, and descriptions of the common portions are omitted.

Referring to FIG. 6, a gyroscopic apparatus 20 includes the two gyro sensors 11 and 12 having substantially the same structure and the mounting base 13 on which the gyro sensors 11 and 12 are mounted. The gyro sensors 11 and 12 are mounted on the second major surface of the mounting base 13 so that the rotation detecting axes are in the same direction and that the gyro sensors 11 and 12 are mounted on the mounting base 13 at the back and the front, respectively. The positional relationship of the gyro sensor 12 with the gyro sensor 11 is such that the gyro sensors 11 and 12 have an approximately 180-degree rotation symmetry about a virtual rotation axis 21 penetrating, between the gyro sensors 11 and 12, the mounting base 13 being substantially parallel thereto in the same direction as the rotation detecting axes. In the gyroscopic apparatus 20, pin terminals of the gyro sensor 12 mounted at the back thereof onto the mounting base 13 are illustrated such that the pin terminals are not connected to the mounting base 13 in order that the positional relationship can be easily recognized. Actually, the pin terminals are somehow connected to an adder, which will not be described. A description of the connection relationship is omitted.

In the gyroscopic apparatus 20 shown in FIG. 6, when an angular velocity in the direction of the rotation detecting axes is applied, the gyro sensors 11 and 12 output signals of substantially equal magnitude with the same sign. The adder (not shown) adds the signals and outputs the sum, that is, a double value.

Figure 7:
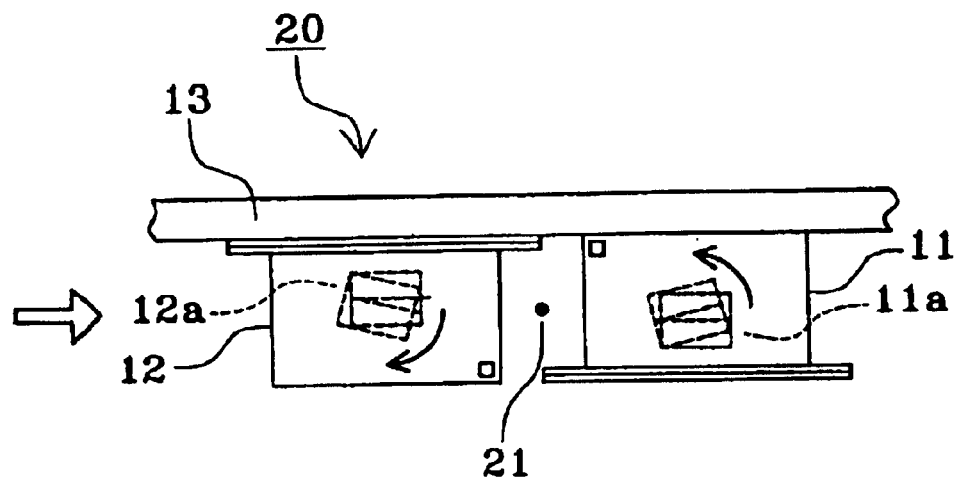
FIG. 7 is an elevation view of the gyroscopic apparatus shown in FIG. 6.

FIG. 7 is an elevation view of the gyroscopic apparatus 20 (viewed in the direction of the rotation detecting axes). Using FIG. 7, the operation of the gyroscopic apparatus 20 to which impact is applied will be described.

When impact is applied to the gyroscopic apparatus 20 from the left, that is, in the direction indicated by the outline arrow of FIG. 7, in the gyro sensor 11, the vibrator 11*a* is displaced in the counter clockwise direction since the vibrator 11*a* is located at a position that is offset to the stem in the casing. A rotational component included in the displacement is added to the original output obtained by the angular velocity and is output. In contrast, in the gyro sensor 12, the vibrator 12*a* is displaced in the clockwise direction. A rotational component included in the displacement is added to the original output obtained by the angular velocity and is output. In the gyro sensors 11 and 12, the absolute values of the added signal components due to the same impact are substantially equal. On the other hand, the rotational components due to the impact applied to the vibrators 11*a* and 12*a* are in the opposite directions. Thus, the signal components due to the impact have the opposite signs. When the signal components are added by the adder (not shown), the signal components are canceled out. Thus, the output of the gyroscopic apparatus 20 is not influenced by the impact.

According to the gyroscopic apparatus 20, by arranging the two gyro sensors 11 and 12 to have a substantially 180-degree rotation symmetry about the virtual rotation axis in the direction of the rotation detecting axes, the output of the gyroscopic apparatus 20 becomes much less susceptible to impact from a specific direction.

According to the gyroscopic apparatus 20, the gyro sensor 12 can be arranged at a position defined by rotating the gyro sensor 11 by approximately 180 degrees around the virtual rotation axis in the direction of the rotation detecting axis, that is, at a position defined parallel translating the gyro sensor 11 from the precisely symmetric position along the mounting surface of the mounting base 13. With this arrangement, the operation that is equivalent to that in a case where two gyro sensors are located at positions having a precise symmetry, as in the gyroscopic apparatus 20, can be achieved.

Figure 8:
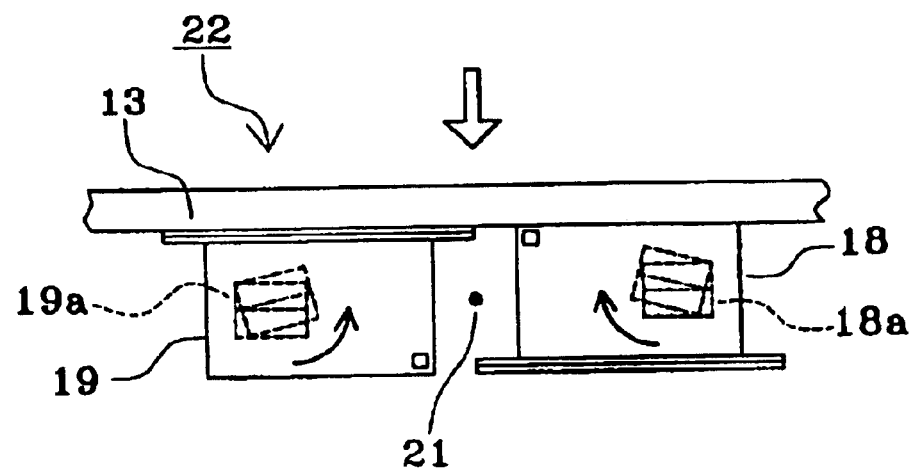
FIG. 8 is an elevation view of a gyroscopic apparatus according to a fourth preferred embodiment of the present invention.

FIG. 8 is an elevation view of a gyroscopic apparatus according to a fourth preferred embodiment of the present invention. Referring to FIG. 8, a gyroscopic apparatus 22 preferably includes the gyro sensors 18 and 19 shown in FIG. 5, instead of the gyro sensors 11 and 12 of the gyroscopic apparatus 20 shown in FIGS. 6 and 7. In FIG. 8, the same reference numerals are given to the same elements or to elements corresponding to those in FIGS. 5 to 7, and descriptions of the common portions are omitted.

In the gyroscopic apparatus 22 shown in FIG. 8, the positional relationship of the gyro sensor 19 with the gyro sensor 18 is such that the gyro sensors 18 and 19 have an approximately 180-degree rotation symmetry about the virtual rotation axis 21 penetrating, between the gyro sensors 18 and 19, the mounting base 13 that is substantially parallel thereto in the same direction as the rotation detecting axes. When an angular velocity is generated in the direction of the rotation detecting axes, the gyro sensors 18 and 19 output signals of substantially equal magnitude with the same sign. An adder (not shown) adds the signals and outputs the sum, that is, a double value.

When impact is applied to the gyroscopic apparatus 22 arranged as described above from the top, that is, in the direction indicated by the outline arrow of FIG. 8, in the gyro sensor 18, the vibrator 18*a* is displaced in the clockwise direction since the vibrator 18*a* is placed at a position that is offset in the width direction in the casing. A rotational component included in the displacement is added to the original output obtained by the angular velocity and is output. In contrast, in the gyro sensor 19, the vibrator 19*a* is displaced in the counter clockwise direction. A rotational component included in the displacement is added to the original output obtained by the angular velocity and is output. In the gyro sensors 18 and 19, the absolute values of the added signal components due to the same impact are substantially equal. On the other hand, the rotational components due to the impact applied to the vibrators 18*a* and 19*a* are in the opposite directions. Thus, the signal components due to the impact have the opposite signs. When the signal components are added by the adder (not shown), the signal components are canceled out. Thus, the output of the gyroscopic apparatus 22 is not influenced by the impact.

According to the gyroscopic apparatus 22, by arranging the two gyro sensors 18 and 19 to have an approximately 180-degree rotation symmetry about the virtual rotation axis in the direction of the rotation detecting axes, the output of the gyroscopic apparatus 22 is not influenced by impact from a specific direction.

Figure 9:
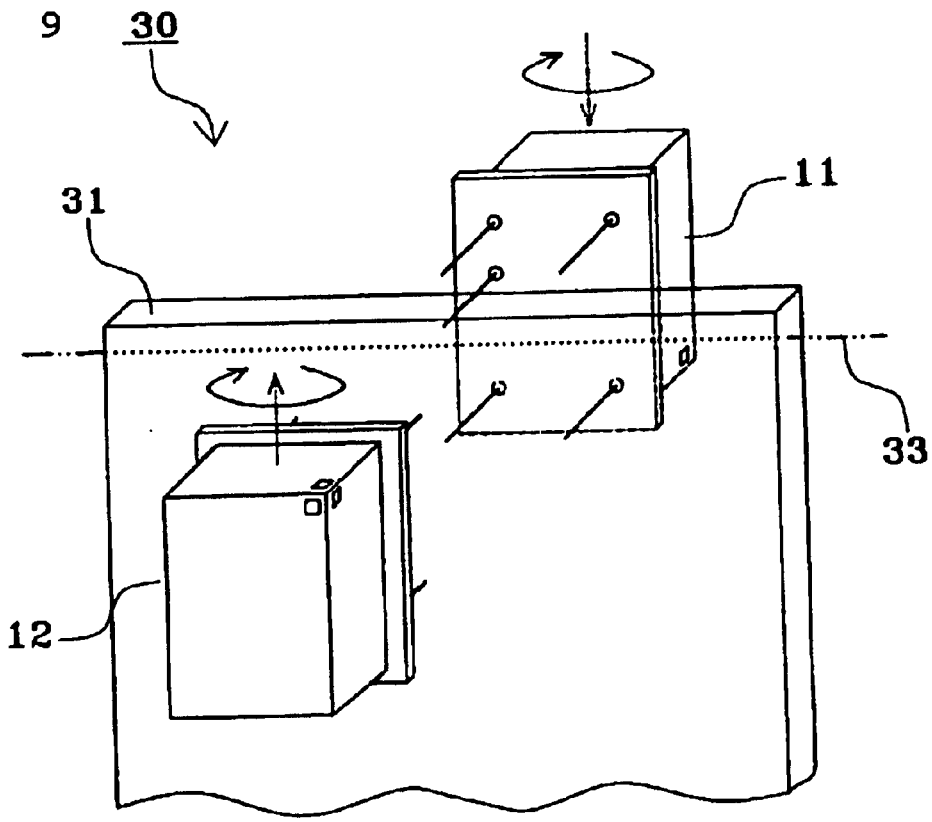
FIG. 9 is a perspective view of a gyroscopic apparatus according to a fifth preferred embodiment of the present invention.

FIG. 9 is a perspective view of a gyroscopic apparatus according to a fifth preferred embodiment of the present invention. In FIG. 9, the same reference numerals are given to the same elements or to elements corresponding to those in FIG. 1, and descriptions of the common portions are omitted.

Referring to FIG. 9, a gyroscopic apparatus 30 preferably includes the two gyro sensors 11 and 12 having substantially the same structure and a mounting base 31 on which the gyro sensors 11 and 12 are mounted. The gyro sensors 11 and 12 are mounted on a first major surface and a second major surface, respectively, of the mounting base 31, so that the rotation detecting axes are opposite to each other and so that the gyro sensors 11 and 12 are opposed to each other. The positional relationship of the gyro sensor 12 with the gyro sensor 11 is such that the gyro sensors 11 and 12 have an approximately 180-degree rotation symmetry about a virtual rotation axis 33 penetrating the mounting base 31 that is substantially parallel thereto in the direction that is substantially perpendicular to the rotation detecting axes. As described below, a subtracter for computing the difference between signals output from the two gyro sensors 11 and 12 is provided on the mounting base 31. A description of the subtracter is omitted here since the structure of a subtracter is well known.

Figure 10:
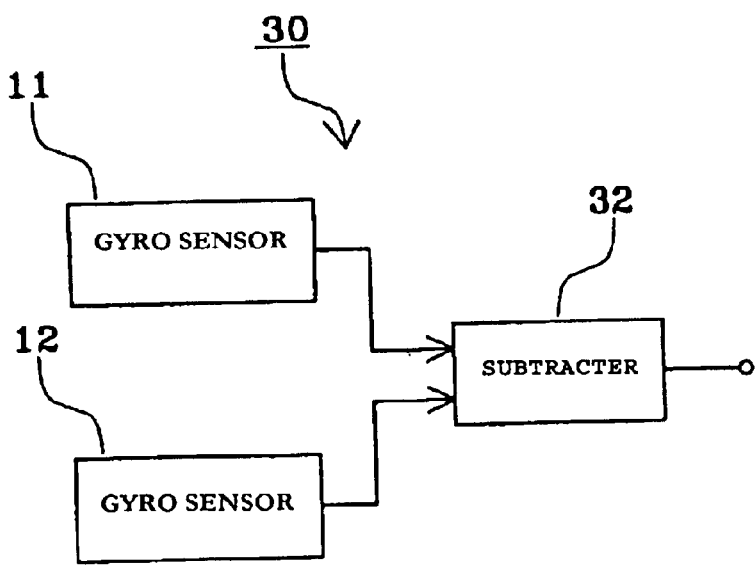
FIG. 10 is a block diagram of the gyroscopic apparatus shown in FIG. 9.

FIG. 10 is a block diagram of the gyroscopic apparatus 30 shown in FIG. 9. As shown in FIG. 10, the gyroscopic apparatus 30 preferably includes the two gyro sensors 11 and 12 and a subtracter 32 for computing the difference between the outputs of the gyro sensors 11 and 12.

When an angular velocity in the direction of the rotation detecting axes is applied to the gyroscopic apparatus 30 shown in FIGS. 9 and 10, the gyro sensors 11 and 12 output signals of substantially the same magnitude, with opposite signs. The subtracter 32 computes the difference between the output signals and outputs the difference, that is, a double value.

Figure 11:
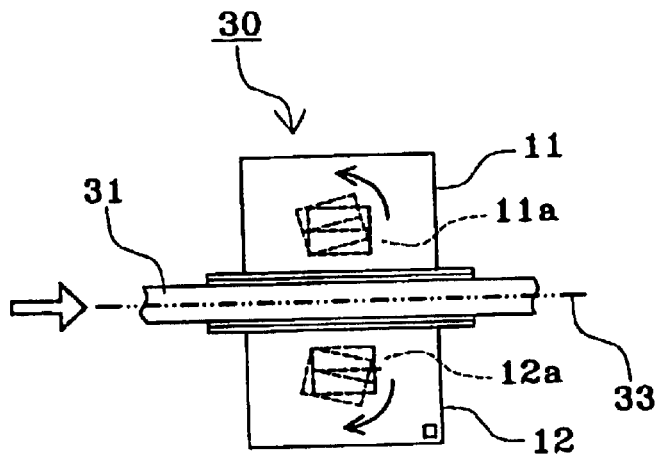
FIG. 11 is an elevation view of the gyroscopic apparatus shown in FIG. 9.

FIG. 11 is an elevation view of the gyroscopic apparatus 30 (viewed in the direction of the rotation detecting axes). Using FIG. 11, the operation of the gyroscopic apparatus 30 to which impact is applied will be considered.

When impact is applied to the gyroscopic apparatus 30 from the left, that is, in the direction indicated by the outline arrow of FIG. 11, in the gyro sensor 11, the vibrator 11a is displaced in the counter clockwise direction since the vibrator 11a is placed at a position offset to the stem in the casing. A rotational component included in the displacement is added to the original output obtained by the angular velocity and is output. In contrast, in the gyro sensor 12, the vibrator 12a is displaced in the clockwise direction. A rotational component included in the displacement is added to the original output obtained by the angular velocity and is output. In the gyro sensors 11 and 12, the angular-velocity detecting axes, i.e., the rotation detecting axes, are in the opposite directions. Thus, the rotational components generated by the impact are in the same direction with respect to the angular-velocity rotation axes. In the gyro sensors 11 and 12, the absolute values of the added signal components generated due to the same impact are substantially equal. As described above, in the gyro sensors 11 and 12, the rotational components generated due to the impact applied to the vibrators 11a and 12a are in the same direction. Thus, the signal components generated due to the impact have the same sign. When the difference between the signal components is computed by subtracter 32, the signal components are canceled out. The output of the gyroscopic apparatus 30 is not influenced by the impact.

Figure 12:
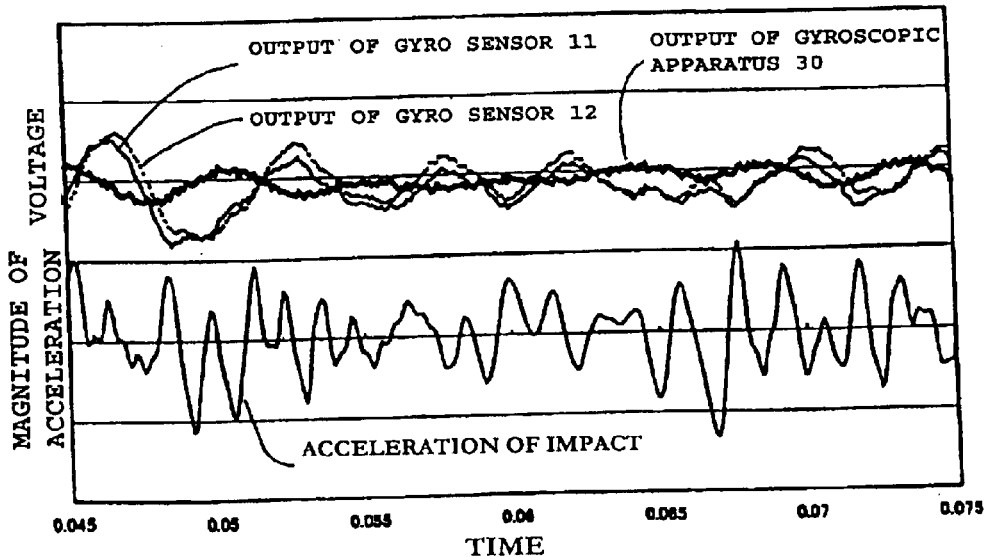
FIG. 12 is a characteristic diagram showing the relationship between the acceleration of impact applied to the gyroscopic apparatus shown in FIG. 9 and the output thereof.

FIG. 12 shows the relationship of the acceleration of impact applied randomly to the gyroscopic apparatus 30 arranged as described above in the direction indicated by the outline arrow of FIG. 11 with the outputs of the gyroscopic apparatus 30 and the gyro sensors 11 and 12. For the purpose of comparison, each output is represented by the absolute value, and the output of the gyroscopic apparatus 30 is reduced to half. An angular velocity applied to the gyroscopic apparatus 30 is constant. As is clear from FIG. 12, the outputs of the gyro sensors 11 and 12 fluctuate greatly due to the impact. Since the fluctuations are in the same direction, the output of the gyroscopic apparatus 30, that is, the difference between the two outputs, fluctuates little. Thus, the output of the gyroscopic apparatus 30 is not susceptible to impact.

According to the gyroscopic apparatus 30, by arranging the two gyro sensors 11 and 12 to have an approximately 180-degree rotation symmetry about the virtual rotation axis orthogonal to the rotation detecting axes, the output of the gyroscopic apparatus 30 becomes less susceptible to impact from a specific direction.

In the gyroscopic apparatus 30 arranged as described above, when gyro sensors, such as the gyro sensors 18 and 19, in which vibrators are arranged in casings at positions offset in the width direction are used, the output of the gyroscopic apparatus 30 remains susceptible to impact.

According to the gyroscopic apparatus 30, the gyro sensor 12 can be arranged at a position defined by rotating the gyro sensor 11 by approximately 180 degrees around the virtual rotation axis in a direction that is substantially perpendicular to the rotation detecting axis, that is, at a position defined by parallel translating the gyro sensor 11 from the precisely symmetric position along the mounting surface of the mounting base 31. With this arrangement, the operation that is equivalent to that in a case where two gyro sensors are placed at positions having a precise symmetry, as in the gyroscopic apparatus 30, can be achieved.

Figure 13:
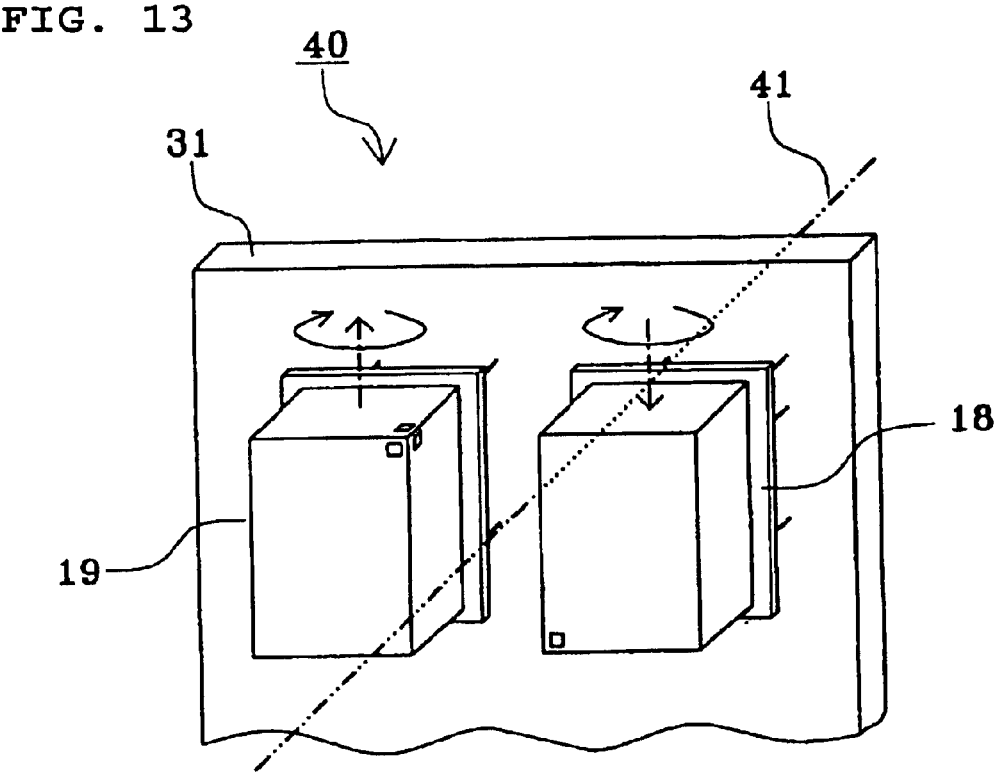
FIG. 13 is a perspective view of a gyroscopic apparatus according to a sixth preferred embodiment of the present invention.

FIG. 13 is a perspective view of a gyroscopic apparatus according to a sixth preferred embodiment of the present invention. Referring to FIG. 13, a gyroscopic apparatus 40 preferably includes the gyro sensors 18 and 19 shown in FIG. 5, instead of the gyro sensors 11 and 12 of the gyroscopic apparatus 30 shown in FIG. 9. In FIG. 13, the same reference numerals are given to the same elements or to elements corresponding to those in FIGS. 5 and 9, and descriptions of the common portions are omitted.

Referring to FIG. 13, the gyroscopic apparatus 40 preferably includes the two gyro sensors 18 and 19 having substantially the same structure and the mounting substrate 31 on which the gyro sensors 18 and 19 are mounted. The gyro sensor 18 and the gyro sensor 19 are mounted next to each other on the second major surface of the mounting base 31 such that the rotation detecting axes are opposite to each other. The positional relationship of the gyro sensor 19 with respect to the gyro sensor 18 is such that the gyro sensors 18 and 19 are arranged to have an approximately 180-degree rotation symmetry about a virtual rotation axis 41 which is substantially perpendicular to the rotation detecting axes and which penetrates the mounting base 31 in the thickness direction between the gyro sensors 18 and 19.

According to the gyroscopic apparatus 40 shown in FIG. 13, when an angular velocity is applied in the direction of the rotation detecting axes, the gyro sensors 18 and 19 output signals of substantially equal magnitude with the opposite signs. A subtracter (not shown) obtains the difference between the output signals and outputs the difference, namely, a double value.

Figure 14:
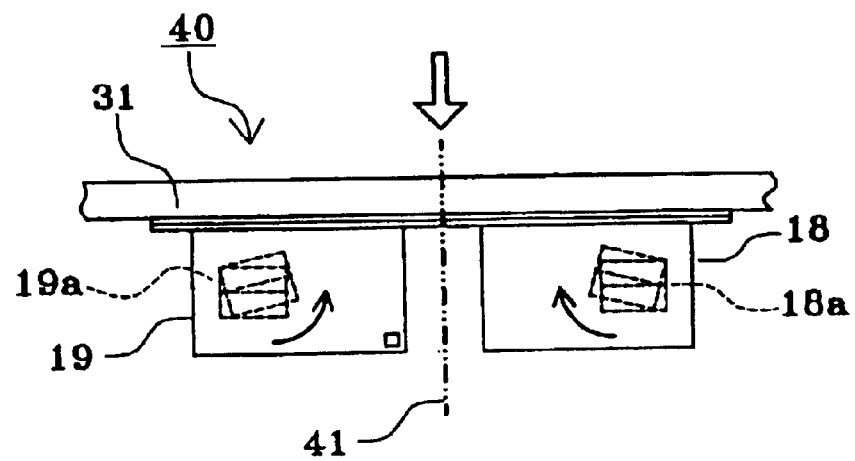
FIG. 14 is an elevation view of the gyroscopic apparatus shown in FIG. 13.

FIG. 14 is an elevation view of the gyroscopic apparatus 40 (viewed from the direction of the rotation detecting axes). Using FIG. 14, the operation of the gyroscopic apparatus 40 to which impact is applied will be considered.

When impact is applied to the gyroscopic apparatus 40 as viewed from the top, that is, in the direction indicated by the outline arrow of FIG. 14, in the gyro sensor 18, the vibrator 18a is displaced in the clockwise direction since the vibrator 18a is located at a position that is offset to the right in the casing. A rotational component included in the displacement is added to the original output obtained by the angular velocity and is output. In contrast, in the gyro sensor 19, the vibrator 19a is displaced in the counter clockwise direction. A rotational component included in the displacement is added to the original output obtained by the angular velocity and is output. In the gyro sensors 18 and 19, the angular-velocity detecting axes, that is, the rotation detecting axes, are in the opposite directions. Thus, the rotational components generated by the impact are in the same direction with respect to the angular-velocity detecting axes. In the gyro sensors 18 and 19, the absolute values of the added signal components added generated due to the same impact are substantially equal. As described above, in the gyro sensor 18 and 19, the rotational components generated due to the impact applied to the vibrators 18a and 19a are in the same direction. Thus, the signal components generated due to the impact have the same sign. When the difference between the signal components is computed by the subtracter (not shown), the signal components are canceled output. Accordingly, the output of the gyroscopic apparatus 40 is not influenced by the impact.

According to the gyroscopic apparatus 40, by arranging the two gyro sensors 18 and 19 to have an approximately 180-degree rotation symmetry about the virtual rotation axis that is substantially perpendicular to the rotation detecting axes, the output of the gyroscopic apparatus 40 becomes less susceptible to impact from a specific direction.

In the gyroscopic apparatus 40 arranged as described above, when gyro sensors, such as the gyro sensors 11 and 12, in which vibrators are arranged in casings at positions offset in the height direction are used, the output of the gyroscopic apparatus 40 remains susceptible to impact.

According to the gyroscopic apparatus 40, the gyro sensor 19 can be arranged at a position defined by rotating the gyro sensor 18 by approximately 180 degrees around the virtual rotation axis in a direction that is substantially perpendicular to the rotation detecting axes, that is, at a position defined by parallel translating the gyro sensor 18 from the precisely symmetric position along the mounting surface of the mounting base 31. With this arrangement, the operation that is equivalent to that in a case where two gyro sensors are placed at positions having a precise symmetry, as in the gyroscopic apparatus 40, can be achieved.

Figure 15:
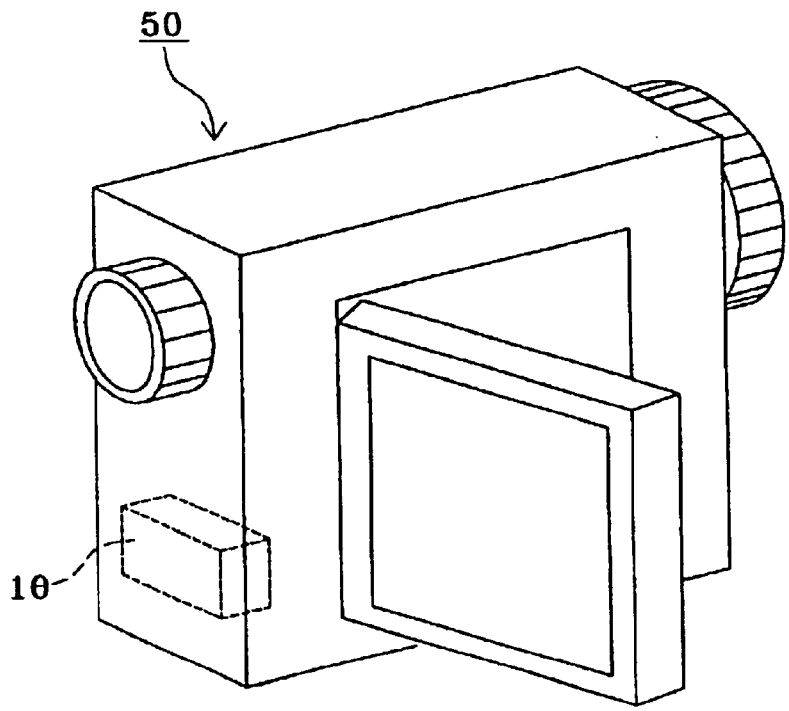
FIG. 15 is a perspective view of a preferred embodiment of an electronic apparatus according to the present invention.

FIG. 15 is a perspective view of a video camera which is a preferred embodiment of an electronic apparatus according to the present invention, although many other electronic apparatuses are possible according to the present invention. Referring to FIG. 15, a video camera 50 preferably includes the vibrating gyroscope 10 of the other preferred embodiments of the present invention described above, so as to compensate for camera movement caused by an unsteady hand, for example.

In the video camera 50 arranged as described above, the gyroscopic apparatus 10 in which a malfunction due to impact is less likely to occur is used. Thus, the performance of the video camera 50 can be improved.

An example of the electronic apparatus of the present invention is not limited to the video camera. The electronic apparatus of the present invention is applicable to any electronic apparatus including a vibrating gyroscope, such as a digital camera which similarly uses the vibrating gyroscope for compensating for camera movement caused by an unsteady hand, a navigation apparatus which uses the vibrating gyroscope for detecting a position, a vehicle-rollover detector, and a vehicle-attitude detector.

While preferred embodiments of the invention have been described above, it is to be understood that variations and modifications will be apparent to those skilled in the art without departing the scope and spirit of the invention. The scope of the invention, therefore, is to be determined solely by the following claims.

What is claimed is:

1. A gyroscopic apparatus comprising:
   first and second gyro sensors having substantially the same structure; and
   an adder arranged to add the outputs of the first and second gyro sensors;
   wherein the first and second gyro sensors are arranged so that signals output in response to an angular velocity applied thereto have the same sign and that signals output in response to an impact applied thereto have opposite signs and
   a direction of vibration of the first gyro sensor is different than a direction of vibration of the second gyro sensor in response to the impact applied thereto.

2. A gyroscopic apparatus according to claim 1, wherein the first and second gyro sensors are arranged to have an approximately 180-degree rotation symmetry about a virtual rotation axis which is in the direction of rotation detecting axes.

3. A gyroscopic apparatus according to claim 1, wherein the second gyro sensor is arranged at a position defined by parallel translating the first gyro sensor which is rotated by approximately 180 degrees about a virtual rotation axis which is in the direction of rotation detecting axes.

4. A gyroscopic apparatus according to claim 1, further comprising a mounting base having first and second major surfaces, wherein the first gyro sensor is disposed on the first major surface of the mounting base and the second gyro sensor is disposed on the second major surface of the mounting base.

5. A gyroscopic apparatus according to claim 1, further comprising a mounting base, wherein the first and second gyro sensors are disposed on one of the surfaces of the mounting base.

6. A gyroscopic apparatus according to claim 1, wherein the first and second gyro sensors comprise vibrating gyroscopes having vibrating masses.

7. An electronic apparatus comprising a gyroscopic apparatus according to claim 1.

8. An electronic apparatus according to claim 7, wherein the electronic apparatus is one of a video camera, a digital camera, a navigation apparatus, a vehicle-rollover detector, and a vehicle-attitude detector.

9. A gyroscopic apparatus according to claim 1, wherein the first and second gyro sensors are arranged so as to output signals of substantially equal magnitude with the same sign.

10. A gyroscopic apparatus according to claim 9, wherein the adder determines the sum of the output signals and outputs the difference which is a double value.

11. A gyroscopic apparatus comprising:
    first and second gyro sensors having substantially the same structure; and
    a subtracter arranged to determine the difference between the outputs of the first and second gyro sensors;
    wherein the first and second gyro sensors are arranged so that signals output in response to an angular velocity applied thereto have opposite signs and that signals output in response to an impact applied thereto have the same sign.

12. A gyroscopic apparatus according to claim 11, wherein the first and second gyro sensors are arranged to have an approximately 180-degree rotation symmetry about a virtual rotation axis which is substantially perpendicular to rotation detecting axes.

13. A gyroscopic apparatus according to claim 11, wherein the second gyro sensor is arranged at a position defined by parallel translating the first gyro sensor which is rotated by approximately 180 degrees about a virtual rotation axis which is substantially perpendicular to rotation detecting axes.

14. A gyroscopic apparatus according to claim 11, further comprising a mounting base having first and second major surfaces, wherein the first gyro sensor is disposed on the first major surface of the mounting base and the second gyro sensor is disposed on the second major surface of the mounting base.

15. A gyroscopic apparatus according to claim 11, further comprising a mounting base, wherein the first and second gyro sensors are disposed on one of the surfaces of the mounting base.

16. A gyroscopic apparatus according to claim 11, wherein the first and second gyro sensors comprise vibrating gyroscopes having vibrating masses.

17. An electronic apparatus comprising a gyroscopic apparatus according to claim 11.

18. An electronic apparatus according to claim 17, wherein the electronic apparatus is one of a video camera, a digital camera, a navigation apparatus, a vehicle-rollover detector, and a vehicle-attitude detector.

19. A gyroscopic apparatus according to claim 11, wherein the first and second gyro sensors are arranged so as to output signals of substantially equal magnitude with opposite signs.

20. A gyroscopic apparatus according to claim 19, wherein the subtracter determines the difference between the output signals and outputs the difference which is a double value.

* * * * *